|  |

United States Patent
Hull et al.

(10) Patent No.: US 11,077,422 B2
(45) Date of Patent: Aug. 3, 2021

(54) SPALLING COMPOSITE PARTICLES AND METHODS OF USING THEM

(71) Applicant: AquaBlok, Ltd., Swanton, OH (US)

(72) Inventors: John H. Hull, Swanton, OH (US); Scott A. Collins, Swanton, OH (US)

(73) Assignee: AquaBlok, Ltd., Swanton, OH (US)

( * ) Notice: Subject to any disclaimer, the term of this patent is extended or adjusted under 35 U.S.C. 154(b) by 0 days.

(21) Appl. No.: 16/623,092

(22) PCT Filed: Jun. 14, 2018

(86) PCT No.: PCT/US2018/037489
§ 371 (c)(1),
(2) Date: Dec. 16, 2019

(87) PCT Pub. No.: WO2018/232082
PCT Pub. Date: Dec. 20, 2018

(65) Prior Publication Data
US 2020/0179904 A1    Jun. 11, 2020

Related U.S. Application Data

(60) Provisional application No. 62/520,794, filed on Jun. 16, 2017.

(51) Int. Cl.
*B01J 20/22* (2006.01)
*B01J 20/12* (2006.01)
(Continued)

(52) U.S. Cl.
CPC ............ *B01J 20/223* (2013.01); *B01J 20/12* (2013.01); *B01J 20/20* (2013.01);
(Continued)

(58) Field of Classification Search
CPC ... B01J 20/22; B01J 20/28; B01J 20/12; B01J 20/20; B01J 20/32; B01J 20/223;
(Continued)

(56) References Cited

U.S. PATENT DOCUMENTS

| 5,538,787 A * | 7/1996 | Nachtman | E02B 3/16 428/323 |
| 5,897,946 A * | 4/1999 | Nachtman | E02B 3/12 405/17 |

(Continued)

FOREIGN PATENT DOCUMENTS

| WO | WO-2016014199 A1 * | 1/2016 | ............... B09C 1/10 |

*Primary Examiner* — Ellen M McAvoy
(74) *Attorney, Agent, or Firm* — MacMillan, Sobanski & Todd, LLC

(57) ABSTRACT

Composite particles contain a natural stone or aggregate core and a coating of two or more sorbent layers collectively containing at least two distinct kinds of sorbent materials effective for sorbing two distinct contaminants. One or both sorbent layers may be mixed with a water-absorbent, swellable clay that, upon contact with water, causes spalling or disintegration of the coating layer to release the sorptive material into a body of water such as a pond, ditch, stream, or riverbed. Additional swellable or protective layers may also be present. The composite particles are deployed into a pond, ditch, river, or streambed where the core of natural stone remains in the riverbed. The sorptive materials of the two different sorbent layers sorb and fix a wide range of contaminants, including both the heavy and light-weight hydrocarbons, from the water, and settle as a fine sediment. The sediment with sorbed contaminants is then removed by means such as hydraulic collectors or dredging.

22 Claims, 10 Drawing Sheets

(51) Int. Cl.
*B01J 20/20* (2006.01)
*B01J 20/28* (2006.01)
*B01J 20/32* (2006.01)
*B09C 1/00* (2006.01)
*C02F 1/28* (2006.01)
*E02F 3/88* (2006.01)
*E02F 3/92* (2006.01)
*E02F 3/94* (2006.01)
*C02F 103/00* (2006.01)

(52) U.S. Cl.
CPC ..... *B01J 20/28021* (2013.01); *B01J 20/3204* (2013.01); *B01J 20/324* (2013.01); *B01J 20/3236* (2013.01); *B01J 20/3244* (2013.01); *B01J 20/3289* (2013.01); *B01J 20/3293* (2013.01); *B09C 1/002* (2013.01); *C02F 1/288* (2013.01); *E02F 3/88* (2013.01); *E02F 3/9262* (2013.01); *E02F 3/945* (2013.01); *C02F 1/283* (2013.01); *C02F 1/286* (2013.01); *C02F 2103/007* (2013.01); *E02F 3/8891* (2013.01)

(58) Field of Classification Search
CPC .............. B01J 20/28021; B01J 20/3204; B01J 20/3236; B01J 20/324; B01J 20/3244; B01J 20/3289; B01J 20/3293; B09C 1/002; C02F 1/288; C02F 1/283; C02F 1/286; C02F 2103/007; E02F 3/88; E02F 3/9262; E02F 3/945
See application file for complete search history.

(56) References Cited

U.S. PATENT DOCUMENTS

| | | | | |
|---|---|---|---|---|
| 6,042,733 A * | 3/2000 | Tucker | ............... | E02B 3/023 210/747.5 |
| 6,346,199 B1 * | 2/2002 | Tucker | ............... | E02B 3/023 210/747.4 |
| 6,386,796 B1 * | 5/2002 | Hull | ............... | B09C 1/00 405/128.1 |
| 6,558,081 B2 * | 5/2003 | Hull | ............... | B09C 1/00 405/128.15 |
| 7,011,766 B1 * | 3/2006 | Hull | ............... | B09C 1/08 252/88.1 |
| 7,438,500 B2 * | 10/2008 | Hull | ............... | C04B 20/1055 106/705 |
| 7,513,008 B2 * | 4/2009 | Tucker | ............... | E02F 3/925 15/320 |
| 8,569,205 B2 * | 10/2013 | Kuhel | ............... | B01J 20/0266 502/414 |
| 8,771,519 B2 * | 7/2014 | Kuhel | ............... | B01J 20/06 210/679 |
| 2017/0203346 A1 * | 7/2017 | Hull | ............... | B09C 1/10 |

* cited by examiner

SPALLING COMPOSITE PARTICLES AND METHODS OF USING THEM

RELATED APPLICATIONS

This is a national phase application of international application PCT/US18/37489, filed under the authority of the Patent Cooperation Treaty on Jun. 14, 2018, published; which claims priority to U.S. Provisional Application No. 62/520,794, filed under 35 U.S.C. § 111(b) on Jun. 16, 2017. All of the aforementioned applications are incorporated herein by reference for all purposes.

BACKGROUND

The present disclosure generally relates to materials and methods for environmental remediation including spill response to transportation or pipeline accidents, including, in particular, composite particles designed intentionally to spall or disintegrate to release remedial or sorbent materials to address the contamination.

Through a variety of uptake mechanisms, contaminants may enter the base of the food chain, which has many implied ecological receptor and human health risks. Typical contaminants include both (1) organic pollutants (e.g., pesticides, insecticides, herbicides, polynuclear aromatic hydrocarbons (PAHs), chlorinated hydrocarbon compounds such as polychlorinated biphenyl (e.g., PCBs), tributyl-tin (TBT), dioxin, volatile organic compounds (VOCs), organic solvents, and/or non-aqueous phase liquids (NAPL) both "light" (LNAPL) and "dense" (DNAPL)); and (2) inorganic pollutants (e.g., heavy metals such a mercury and arsenic, ammonia, nitrates, and/or phosphates). For many organic contaminants, including petrochemicals, the molecular weight may be considerably varied, such that the contaminants may be loosely categorized into fractions, such as light, medium, and heavy fractions. Light fractions may include benzene, toluene, VOCs, NAPLs, and other hydrocarbons of about 6 carbons or fewer. In contrast, heavy fractions may include more complex hydrocarbons of 8 or more carbons, motor oils, creosote, coal tars, sludge, and other petroleum or coal residuals. The relative mobility and bioavailability of these contaminant fractions can present challenging ecological or human health hazards. The faster and more mobile the contaminant, the faster it partitions and spreads both by diffusion and stream flow. Consequently, more mobile light-weight fractions may pose a greater initial risk to food chain contamination and may be more costly to remediate.

Some of these contaminants found in soils may be water dispersible and may contaminate streams and rivers, before washing into lakes or oceans. The relative mobility and the continual leaching or partitioning of such varied-weight contaminants between the soil and the water make cleanup very challenging.

AquaBlok®/AquaGate™ or Blended Barrier™/AquaGate™ (AB/AG or BB/AG) are commercially sold by AquaBlok, Ltd., as useful for sediment capping and for waterway protection. Briefly, these systems employ an aggregate core particle that is layered with the reactive amendment materials and deployed over the contaminated site. See, e.g. U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, and U.S. Pat. No. 7,438,500, which issued to Hull on Oct. 21, 2008, each of which is incorporated herein by reference in their entirety for all purposes.

Some other treatment products in sediment capping systems reduce the bioavailability of toxic material by chemical fixation/complexation, some by sorption, both adsorption and absorption (e.g. activated carbon/organoclays or silt and clay soil particles, respectively), and some by a combination of sorption and chemical fixation (Sorbster™). U.S. Pat. Nos. 8,569,205 and 8,771,519 describe the sorptive media used in some of these approaches.

Streamside, LLC, (Findlay, Ohio) is a firm that specializes in restoration of stream beds to remove accumulated sediments in a non-invasive and non-turbidity inducing manner They distribute two types of systems. The first system is a hydraulic sediment collector system (see FIG. 2) that lies in a stream bed and forces sediment up a ramp to a grated opening where it falls or is suctioned into a cavity for discharge through a vacuum hose. This system is described in U.S. Pat. Nos. 6,042,733 and 6,346,199. The second system is a more portable, hand-held system called a "Sand Wand" (see FIG. 7) that sprays a water jet into the sediment to disturb and suspend the sediment within a hood or housing. A suction hose then removes suspended sediment from the housing. U.S. Pat. No. 7,513,008 further describes this system.

Still, it is desirable to provide a better means for remediating bodies of water to remove contaminated sediments.

SUMMARY

In a first aspect, the invention relates to a spallable composite particle, the particle comprising a natural stone or aggregate core at least partially coated with two or more coating layers, including (a) an inner sorbent layer disposed over the core, the inner sorbent layer containing a first sorptive material for binding a first type of contaminant; and (b) an outer sorbent layer disposed over the inner sorbent layer, the outer sorbent layer containing a second sorptive material for binding a second type of contaminant, the second sorptive material being different than the first sorptive material, and (c) a hydratable, swellable clay or clay mineral material disposed in at least one of an additional layer between the core and the inner layer or blended with the inner sorbent layer. The hydratable, swellable clay material absorbs water and expands, causing the layers to spall, exposing fresh surface area of the sorbent materials. Bentonite clays are useful for this hydratable, swellable clay material, however other materials may also be used. The composite particle may also contain a hydratable, swellable material between the inner and outer sorbent layers in some embodiments.

In some embodiments, a first type of composite particle is defined by having in the inner sorbent layer a first sorptive material having a sorption coefficient effective for sorbing light-weight hydrocarbon contaminants and having in the outer sorbent layer a second sorptive material having a sorption coefficient effective for sorbing heavy-weight hydrocarbon contaminants. For example, the first sorptive material may be activated carbon, such as powdered activated carbon (PAC), and the second sorptive material may be an organoclay. In some embodiments, a second type of composite particle is defined by reversing the composition of the sorbent layers so that an inner sorbent layer contains a first sorptive material having a sorption coefficient effective for sorbing heavy-weight hydrocarbon contaminants and the outer sorbent layer contains a second sorptive material having a sorption coefficient effective for sorbing light-weight hydrocarbon contaminants.

In some embodiments, the inner sorbent layer may contain PAC blended with bentonite clay and the outer sorbent layer may contain organoclays. In other embodiments, the inner sorbent layer may contain an organoclay and the outer sorbent layer may contain PAC blended with bentonite, and an additional layer of bentonite is disposed between the core and the organoclay layer to provide spalling force.

In another aspect, the invention relates to methods of using the composite particles for removing contaminants from a body of water, the method comprising:

dispersing into the body of water a plurality of spallable composite particles as described above;

allowing at least the inner sorbent layer to absorb water, thereby causing swelling and spalling of portions of the sorbent layers, and exposing the first and second sorptive materials to contaminants in the body of water;

allowing the spalled portions of the sorbent layers to form sediment containing sorbed contaminants; and removing the sediment with sorbed contaminants.

The body of water may be a flowing body of water such as a river, creek, stream, spring, channel, estuary, or brook; or it may be a still body, such as a pond, or ditch. The composite core aggregate may remain in the flowing body of water as river rock or cobbles. Removal of the sediment and sorbed contaminants may be accomplished by any of several means, including e.g., dredging or suctioning.

In some embodiments, the sediment may be removed using a sediment hydraulic collector and filter system, such as the one described in U.S. Pat. No. 6,346,199, incorporated herein. In other embodiments, the sediment may be removed by suctioning the sediment from the bottom of the body of water. A high-pressure jet or stream of water may be injected into the sediment to agitate and disperse it prior to suctioning.

In embodiments where the body of water is flowing, the flow and friction with riverbed may cause turbulence and agitation of sediment. Either form of agitation may cause additional spalling of composite particles present, the additional spalling resulting in freshly exposed sorbent material to assist with re-sorption of contaminants that have desorbed either because of the agitation or because of other concentration-related changes.

Other advantages and features are described herein.

DETAILED DESCRIPTION

Figure 1A:
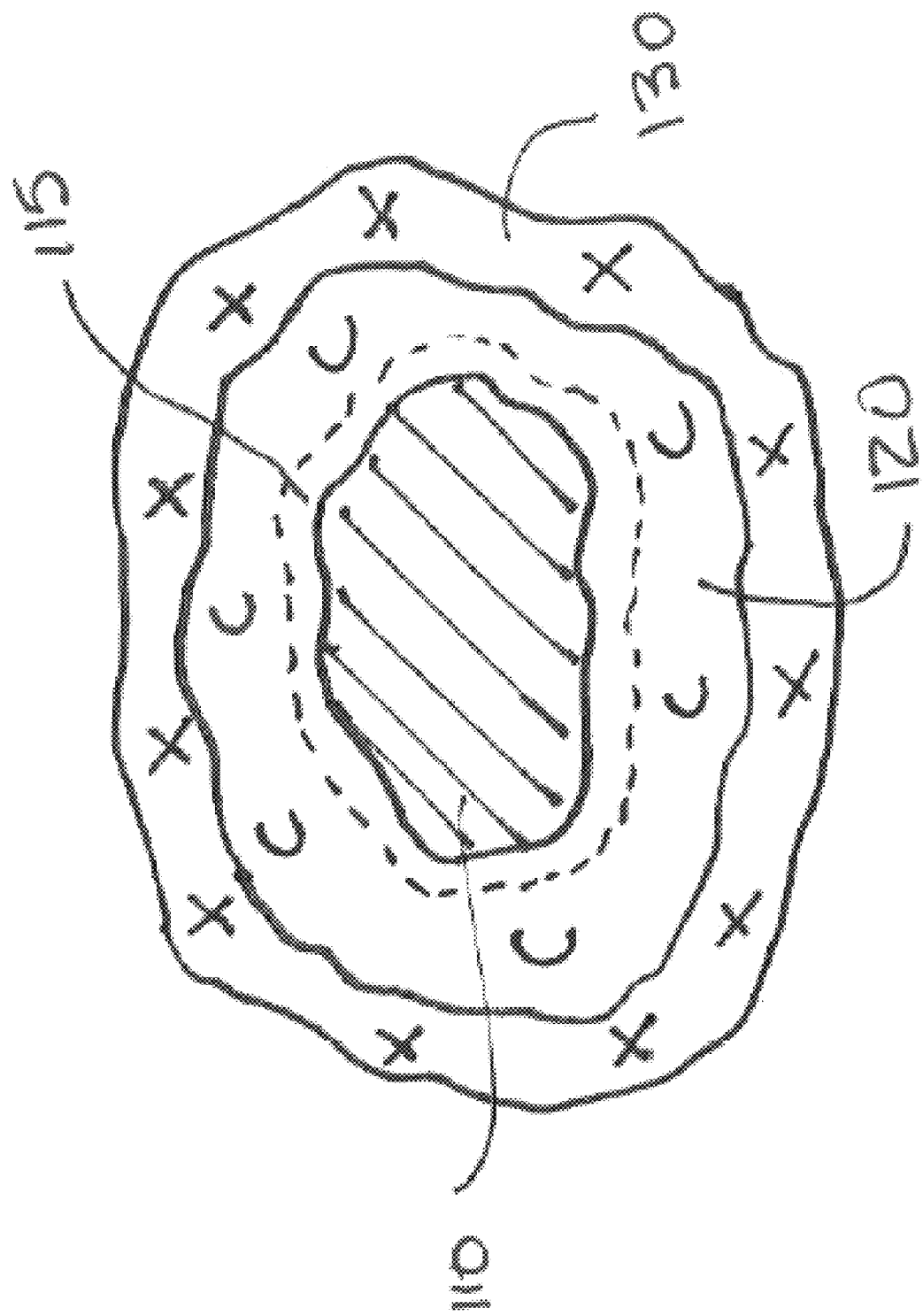
FIGS. 1A-1B are a cross-sectional views of one embodiment of first type and second type composite particles according to the present disclosure.

As used in this disclosure, certain acronyms and terms have the meanings ascribed below. The term "AB" means AquaBlok®, one example of an impermeable layer of a sediment capping system. The term "AG" means AquaGate™, one example of a permeable layer of a sediment capping system. The term "BB" means Blended Barrier™, which is a blend of an AquaBlok® impermeable barrier and aggregate rock.

Where a closed or open-ended numerical range is described herein, all values and subranges within or encompassed by the numerical range are to be considered as being specifically included in and belonging to the original disclosure of the present application as if these values and subranges had been explicitly written out in their entirety. The upper and lower limits of all numerical ranges are deemed to be preceded by the modifier "about."

All patent applications, patent application publications, patents, scientific and technological literature, publications, and references specifically mentioned herein are incorporated herein by reference in their entirety for all purposes.

Composite Particles

In some embodiments, a system of composite particles is used for adsorbing or absorbing environmental contaminants. "Sorbing" encompasses both adsorption and absorption processes, and refers to the attachment—regardless of mechanism—of a "sorbate" ion or compound to a solid medium known as a sorbent. As used herein, a "sorptive material" is a "sorbent;" they are synonymous. Sorbent may also be used as an adjective, as in "sorbent layer" to describe a coating layer that possesses sorptive capacity.

A representative composite particle 100 is shown in FIG. 1. The composite particle 100 includes a core 110, at least partially surrounded by two or more sorbent layers 120, 130, effectively making a multi-layer particle. The core 110 and sorbent layers 120, 130 are described in more detail below. In addition to a sorbent material, a sorbent layer may also contain a hydratable, swellable clay or clay mineral.

The composite particles used in AB, AB/AG, or BB/AG sediment capping systems are known and described in the art along with various specific embodiments and/or sediment capping systems containing the same. See for reference U.S. Pat. No. 5,538,787, which issued to Nachtman et al. on Jul. 23, 1996, U.S. Pat. No. 5,897,946, which issued to Nachtman et al. on Apr. 27, 1999, U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, U.S. Pat. No. 7,438,500, which issued to Hull on Oct. 21, 2008, and WO 2012/048215 published Apr. 12, 2012, each of which is incorporated herein by reference in their entirety for all purposes. The particles may have any desired particle diameter, non-limiting examples of which include composite particles having a particle diameter of less than ¾ inches (~20 mm), including ¼-¾ inches (~5 mm to ~20 mm), and ¼-⅜ inches (~5 mm to ~10 mm).

The term "natural" as used herein with respect to cores refers to a granular piece of stone, rock, aggregate, crushed aggregate, or gravel of a composition that could be found in nature. "Natural" is distinguished from man-made compositions and is important since the core may remain in the environment for a long time after remediation. The core may have any desired particle shape or diameter, a non-limiting example of which includes a particle diameter of ¼-2 inches (~5 mm to ~50 mm). The core may be more dense, less dense, or equally as dense as the coating layers. In an exemplary embodiment, the core has a relatively greater density as compared to that of the coating layers.

Aggregates are small fragments of rock and can range from a small pebble to a large size rock. Aggregates are generally sized by sieving methods, according to the sieve or mesh size which allows them to pass through, thus generating a maximum size parameter. The American Association of State Highway and Transportation Officials (AASHTO) attributes a standard "size number" to aggregate or particles that have a particular size distribution as set forth in their Table C, partially reproduced below. The larger the "size number", the smaller the particle. For example, aggregate particles of standard size number 8 will have a size distribution such that all will pass a 12.5 mm sieve, most (85-100%) will pass a 9.5 mm sieve, only 10-30% will pass a 4.75 mm sieve, and so on.

outer sorbent layer 130 contains a second sorptive mater that is distinct from the first sorptive material.

The sorptive material of the spallable composite particles is generally selected to address the particular remediation need after on-site evaluations. Just as contaminants may be categorized by their chemical nature, sorptive materials (i.e., sorbents) may be classified usefully into groups based on the contaminants they sorb. Table D below summarizes. Sorption may be considered a concentration-driven, sorbing-desorbing process which, at equilibrium, defines a sorption coefficient ($K_d$) that is similar to a partition coefficient as a solute partitions between two phases. Alessandro Delle Site

TABLE C adapted from AASHTO Standard Sizes of Processed Aggregate

Aggregate size distributions, given as
percent (mass) that passes through each standard laboratory sieve

| AASHTO Size No. | 90 mm 3.5 in | 63 mm (2.5 in) | 50 mm (2 in.) | 37.5 mm (1.5 in.) | 25 mm (1 in.) | 19 mm (¾ in.) | 12.5 mm (½ in.) | 9.5 mm (⅜ in.) | 4.75 mm (No. 4) | 2.36 mm (No. 8) | 1.19 mm (No. 16) | 0.297 mm (No. 50) |
|---|---|---|---|---|---|---|---|---|---|---|---|---|
| 1 | 90-100 | 25-60 | | 0-15 | | 0-5 | | | | | | |
| 2 | | 90-100 | 35-70 | 0-15 | | 0-5 | | | | | | |
| 3 | | 100 | 90-100 | 35-70 | 0-15 | | 0-5 | | | | | |
| 4 | | | 100 | 90-100 | 20-55 | 0-15 | | 0-5 | | | | |
| 5 | | | | 100 | 90-100 | 20-55 | 0-10 | 0-5 | | | | |
| 6 | | | | | 100 | 90-100 | 20-55 | 0-15 | 0-5 | | | |
| 7 | | | | | | 100 | 90-100 | 40-70 | 0-15 | 0-5 | | |
| 8 | | | | | | | 100 | 85-100 | 10-30 | 0-10 | 0-5 | |
| 9 | | | | | | | | 100 | 85-100 | 10-40 | 0-10 | 0-5 |

Aggregate and other stone cores useful in the invention may range in standard size number from 4 to 9, or from 5 to 8. The availability of local materials will generally govern the choice of cores. While other materials may be suitable for the core, the natural status of stone or aggregate is ideal in the current application, since the rock core may remain in the riverbed or stream bed.

As shown in FIGS. 1-4, two or more sorbent coating layers 120, 130 are disposed over and partially coat the core 110. The inner sorbent layer 120 is applied over the core 110. The outer sorbent layer 130 is applied over the inner sorbent layer 120 in a somewhat concentric fashion. As used herein "disposed over," "applied over," "coating over", and similar grammatical equivalents imply only a relative order and not physical contact; i.e., these terms do not preclude the inclusion of intermediate layers. For example, an inner coating layer that is disposed over the core may still have one or more additional layers between the core and the inner layer, and there may also be one or more intermediate layers between the inner and outer coating layers, or further coating layers applied over the outer layer. See FIG. 2. It should be understood that the relative thickness of the layers as seen in FIG. 1 need not be as depicted, as the figure is not drawn to scale.

Each sorbent layer 120, 130 includes at least one sorbent material, non-limiting examples of which include an activated carbon, organoclay, alum, activated alumina, humic materials, chitosan, lignin, peat moss, and combinations thereof. The sorbent material may be powdered, and may be dispersed in a matrix of hydratable, swellable clays or clay minerals, for example, sodium bentonite, calcium bentonite, or bentonite clay, such as high quality Wyoming-derived sodium bentonite clay containing montmorillonite. In addition, the composition of the inner sorbent layer 120 differs from that of the outer sorbent layer 130. Said differently, inner sorbent layer 120 contains a first sorptive material and has published an extensive review of the physical and kinetic properties of sorption coefficients, along with coefficient values for a wide variety of organic compounds. (See Delle Site, *Factors Affecting Sorption of Organic Compounds in Natural Sorbent/Water Systems and Sorption Coefficients for Selected Pollutants. A Review*, Journal of Physical and Chemical Reference Data 30, 187 (2001); doi: http://dx.doi.org/10.1063/1.1347984.) A similar literature review by Susan Bailey, et al., discusses sorbents useful for sorbing heavy metals. (See Bailey, et al. *A Review of Potentially Low-Cost Sorbents for Heavy Metals*, Wat. Res. Vol. 33, No. 11, pp. 2469-2479, (1999). Both literature reviews are incorporated herein in their entirety for all purposes.

TABLE D

Contaminant Categories and Useful Sorbents*

| Known or suspected contaminants | | Potentially useful sorbent materials |
|---|---|---|
| Organic: | | |
| Light weight Hydrocarbons | mobile fractions, (typically C6 or less) like VOCs, LNAPLs, toluene, benzene, ethylbenzene, xylene, etc. | Activated carbon, Organoclays, humic materials, etc. |
| Heavy weight Hydrocarbons | Motor oils DNAPLs, tars, coals residuals, creosote, and sludge | Activated carbon, Organoclays, humic materials, etc. |
| Chlorinated hydrocarbons | PCB, DDX (compounds like dichloro-diphenyl trichloroethane (DDT), many pesticides | Activated carbon, Organoclays, humic materials, etc. |
| PolyAromatic Hydrocarbons | PAHs, NAPLs, Pyrene, Anhracene, Phenanthrene many pesticides and herbicides | Activated carbon, Organoclays, humic materials, etc. |

TABLE D-continued

Contaminant Categories and Useful Sorbents*

| Known or suspected contaminants | Potentially useful sorbent materials |
|---|---|
| Inorganic: | |
| Heavy Metals  Cd, Pb, Hg, Cr, As | Activated alumina, (Sorbster ™), lignin, citosan, zeolite, peat moss, EHC-M ™, Provect IRM ™, etc. |
| Nitrogen containing Phosphates, and Phosphorous  Ammonia, nitrates, | Clinoptilolite, Aluminum Sulfate, etc. |
| Emerging Contaminants: | |
| Perflourinated Compounds  Per- and polyfluoroalkyl Substances (PFAS), Perfluorooctanoic Acid (PFOA), etc. | Activated Carbon, RemBind ™, etc. |

*Some of the listed amendments are sorbents with reactive elements included.

While activated carbon is a useful sorbent for both heavy and light-weight organic hydrocarbons, it quickly becomes saturated with heavy-weight contaminants if both are present, as is frequently the case in environmental contaminations with coal, petroleum, or other hydrocarbon contaminants. Consequently, the use of activated carbon as a first sorptive material and an organoclay as a second sorptive material is particularly useful for contamination sites with coal, oil, petroleum, or other hydrocarbon contaminants.

In some cases, the sorbent material may also include other amendments or additives for a specific purpose, typically reactive materials for chemically reacting with a particular toxin or pollutant. For example, MAR Systems of Solon, Ohio provides many varieties of Sorbster™, its proprietary brand activated being alumina media formulated for the removal of mercury, selenium, and arsenic. Additional metals such as vanadium, hexavalent chromium, tin, boron, lead, antimony, molybdenum, cadmium, fluoride, and barium are also removed in some waters using this media. The product line also includes media specific to selenium (Sorbster-Se), mercury (Sorbster-Hg), and fluoride (Sorbster-F).

Another non-limiting example is the media known as EHC-M™ (Adventus, Freeport, Ill., http://www.intersol.fr/pdf2010/Jim%20Meuller_Adventus.pdf), which is an injectable remediation product composed of: controlled-release, food grade, complex carbon; micro-scale zero valent iron (ZVI 5-10 μm); major, minor, and micronutrients; food grade organic binding agent; and sulfate. It is useful for remediation of persistent organic compounds and heavy metals. Provect IRM™ is a similar product from Provectus (Freeport, Ill., http://www.provectusenvironmental.com/technologies/provect-irm/) that contains multiple reagents in a single product: Provect-CH4® (a proprietary source of Monacolin-K and other natural statins that act as methanogenic inhibitors); multiple, hydrophilic, nutrient rich organic carbon sources (plant materials, kelp, calcium propionate); small (ca. 10 to 25 micron) ZVI; chemical oxygen scavengers; integrated vitamins, minerals mineral sources (yeast extracts) specially selected for the growth and development of anaerobes; potassium magnesium sulfate; and PAC to help sequester organo-metal complexes.

Another non-limiting example is the media known as RemBind™ (Ziltek, Kent Town, Australia, http://www.ziltek.com.rembind.html), which is a blend of activated carbon, aluminum hydroxide, kaolin clay, and other proprietary additives for treating a range of organic contaminants including TPH, PAH, PFOS, PCBs, PCPs, and various pesticides.

As mentioned, both the inner and outer sorbent layers 120,130 may also contain a water-absorbent, readily hydratable and swellable clay material that has a sufficiently high swelling capacity upon exposure to water to cause disintegration and release of the sorptive media. Exemplary clay materials suitable for blending with the coating layers include a bentonite clay, such as high quality Wyoming-derived sodium bentonite clay containing montmorillonite. These may cause the spalling as the particle hydrates.

Figure 2:
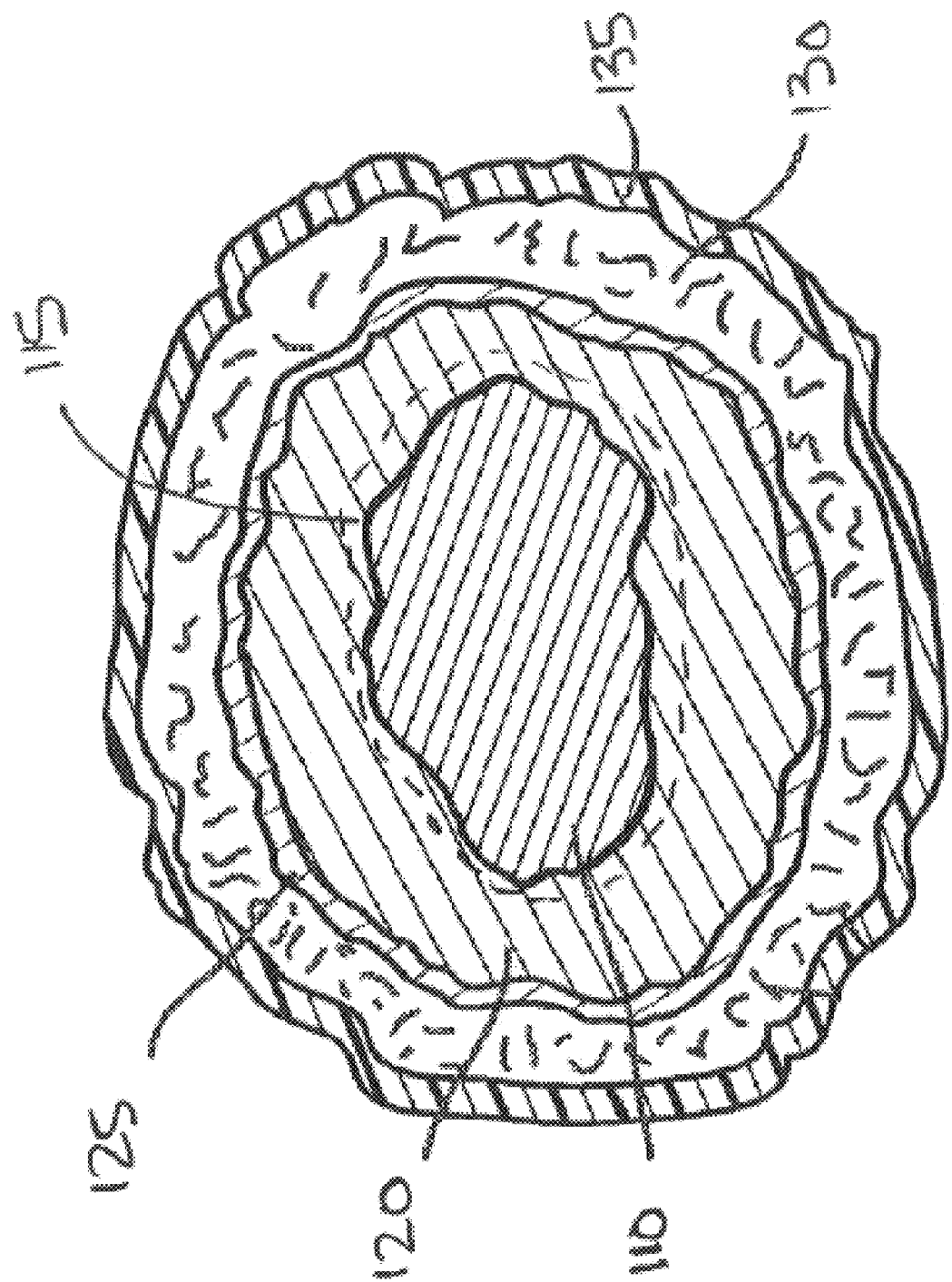
FIG. 2 is a further embodiment of composite particles according to the present disclosure.
Figure 3:
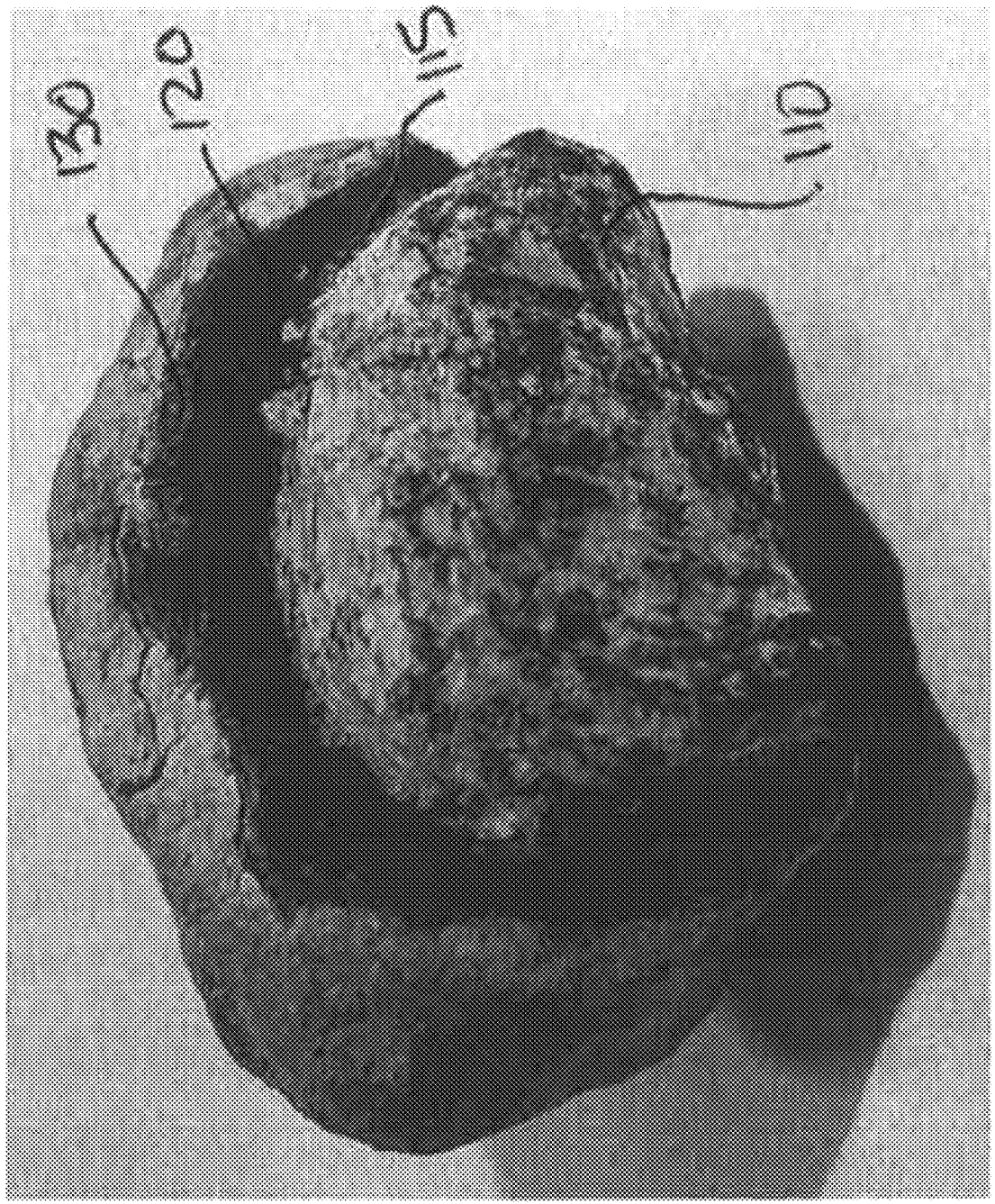
FIG. 3 is a cut-away photograph of a multi-layered particle according to the present disclosure.

Alternatively, one or more optional additional layers of hydratable, swellable clay materials, such as bentonites, may be used in the composite particle beneath one or both sorbent layers. These additional layers may contain bentonites only, with or without sorptive materials. FIG. 2 shows such an embodiment, having an additional bentonite layer 115 between the core 110 and the inner sorbent layer 120, as well as an intermediate bentonite layer 125 between the inner sorbent layer 120 and the outer sorbent layer 130. In water, as these additional and/or intermediate bentonite layers hydrate and swell, they act as a "spalling initiator" by imparting pressure on all further outward layers (outward relative to the core, from wherever the spalling initiator layer is disposed), forcing them to disintegrate. In the case of the intermediate layer 125, disintegration of this layer then exposes the inner sorbent layer, allowing it to commence spalling in a sort of time-release fashion. In the particular embodiment of FIG. 2, there is also shown an optional outermost protective coating 135.

Figure 1B:
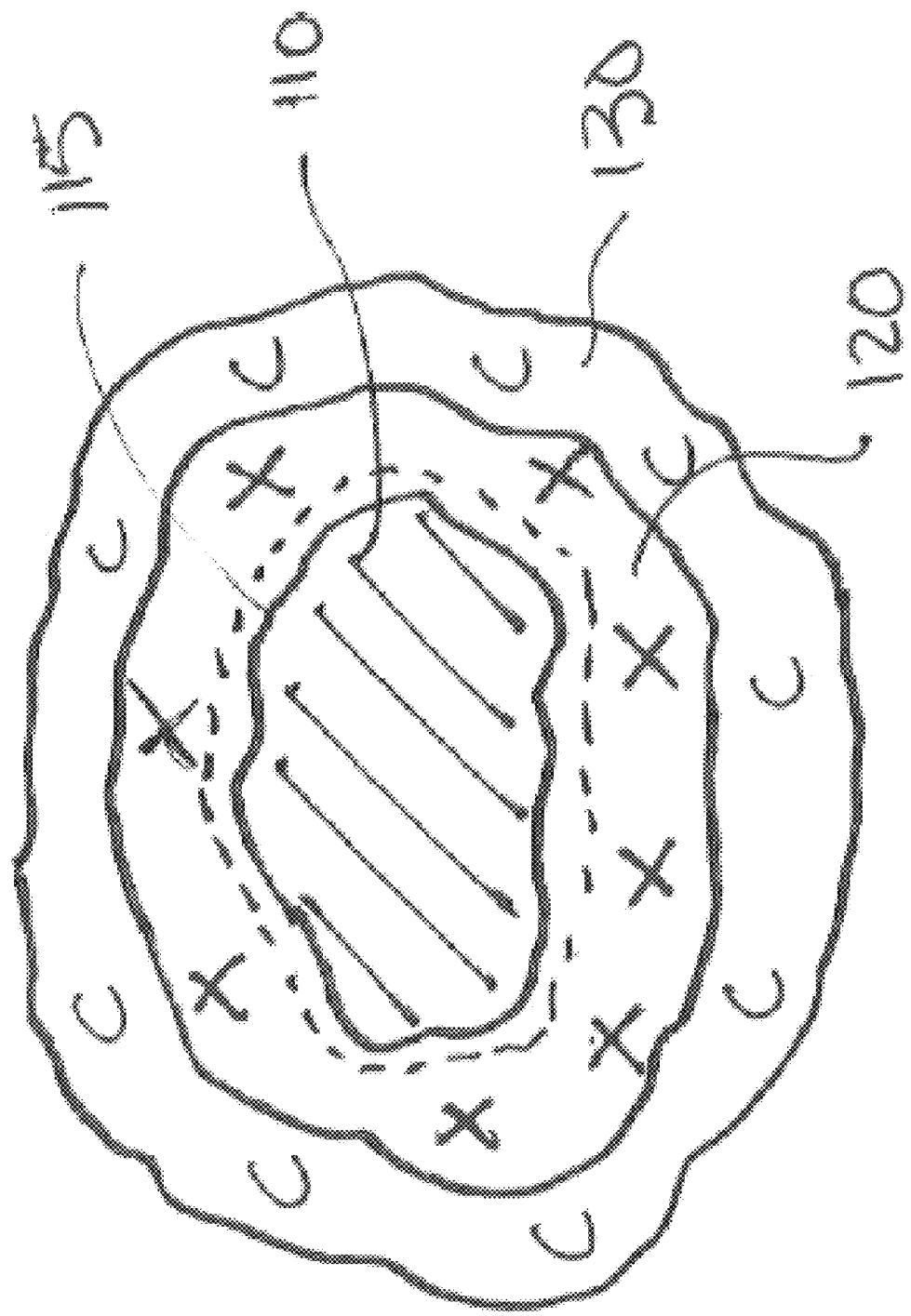

FIG. 1A shows one particular embodiment of a "first-type" composite particle in which the inner layer 120 comprises an activated carbon, C, while the outer layer 130 comprises a sorbent material distinct from activated carbon, X, such as an organoclay or other sorbent material described herein. FIG. 1B, in contrast, shows one particular embodiment of a "second-type" composite particle in which the inner layer 120 comprises a sorbent material distinct from activated carbon, X, such as an organoclay, while the outer layer 130 comprises activated carbon, C, such as PAC. In other words, the composition of inner and outer sorbent layers 120, 130 is reversed in the second-type particle compared to the first-type particle. In still other embodiments both first-type and second-type composite particles are employed together in a composition or system of composite particles. Such a system of both types of composite particles has the advantage of being able to capture both light-weight and heavy-weight contaminant fractions immediately upon initial dissolution or spalling. Further advantages are discussed later.

The composite particles may have any desired weight percent ratio of combined coating layers to core, based on a total weight of the composite particles, non-limiting examples of which include:

| Coating layer (wt %) | Core (wt %) |
|---|---|
| 5 | 95 |
| 10 | 90 |
| 15 | 85 |
| 20 | 80 |
| 25 | 75 |
| 30 | 70 |
| 35 | 65 |

-continued

| Coating layer (wt %) | Core (wt %) |
|---|---|
| 40 | 60 |
| 45 | 55 |
| 50 | 50 |

Expressed as a weight percent of the total particle weight, the relative portions contributed by each of the several multiple layers may vary considerably, depending on the application and performance desired. The following Table E gives some typical ranges for each of the layers:

TABLE E

Relative amounts of coating layers, as a percent of total particle

| Layer | Broad Range | Example Target |
|---|---|---|
| Inner bentonite | 0-20 | 3-10 |
| Inner sorbent | 1-30 | 5-15 |
| Intermediate bentonite | 0-20 | 3-10 |
| Outer sorbent | 1-30 | 10-20 |
| Outer protective | 0-30 | 1-5 |

The composite particles may have any desired dry bulk density, non-limiting examples of which include a dry bulk density of 60-100 lbs/ft$^3$. The composite particles may have a specific gravity of greater than 1.0.

The composite particles may further comprise one or more binders to promote adhesion of the various coating layers to the core or to one another. A non-limiting example of the binder includes a cellulosic polymer. The composite particles may further comprise one or more additional layers containing one or more desired materials and having any desired thickness.

Selected Applications and Uses

Composite particles as described herein, and systems of such particles, may be used in remedial applications in streams and riverbeds or other bodies of water that are suspected to contain contaminants. The dense, granular nature of the composite particles enables them to be easily and uniformly deployed and deposited through a water column (via Stoke's law) and onto the stream, riverbed, or other body of water using conventional materials handling equipment.

Once released into the environment of a stream or riverbed, the hydratable layers swell and cause the inner and outer sorbent layers 120, 130 to spall or disintegrate away from the core and leave the natural core 110 as stone or aggregate along the riverbed. The spalling sorbent layers 120, 130, together with the swellable clay and/or binder materials from the other coating layers, sorb or bind the contaminants and form a sediment with adsorbed contaminants in the body of water. The sediment with adsorbed contaminants is then removed from the stream by any suitable means. Three such means are described herein in connection with FIGS. 5-7.

Figure 5:
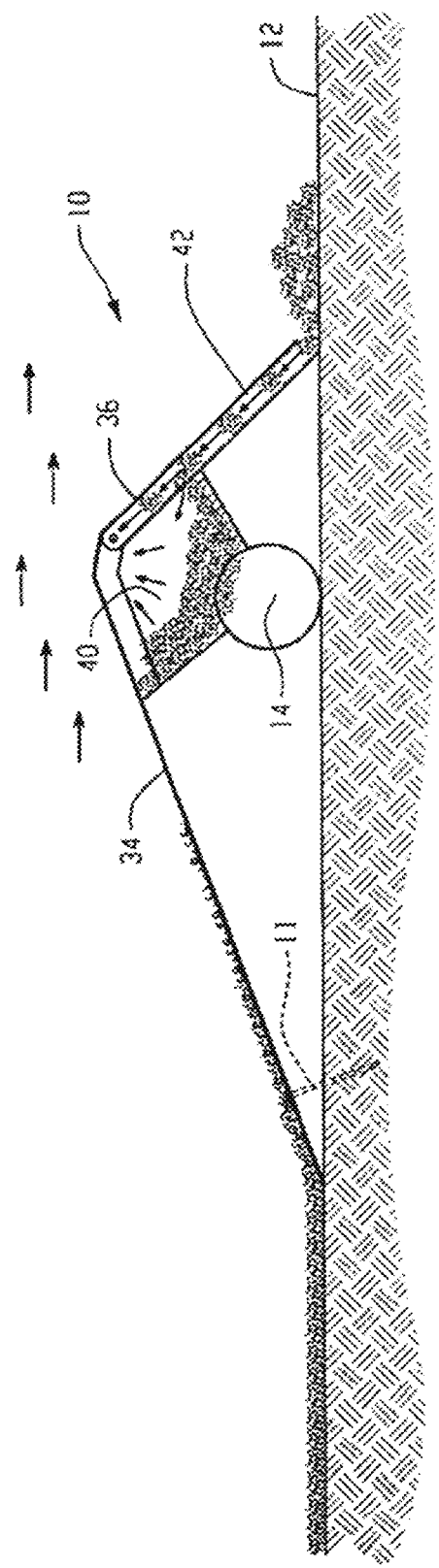
FIG. 5 is a side cross-sectional view of an in-situ hydraulic sediment collection system for removing sediment from a stream.

FIG. 5 depicts an in-situ hydraulic sediment collector, as described further in U.S. Pat. Nos. 6,042,733 and 6,346,199, both incorporated herein by reference for all purposes. A complete description here is unnecessary as the incorporated literature contains this. Briefly, however, the sediment collector 10 comprises a wedge shaped device that is deployed transversely in the floor 12 of a river or stream, and may be held in place with pegs or fasteners 11. The wedge is asymmetric, in that the upstream ramp 34 is longer and more gradual than the downstream or trailing edge 36. The asymmetric design causes an increase in water flow velocity going up the ramp 34 to the apex, followed by a sudden decrease in velocity over the trailing edge 36 after passing the apex. The decreased velocity allows sediment to settle out at the bottom of the wedge. A gentle suction is applied within the interior cavity 40. This suction draws in water and concentrated sediment through channels 42. As the sediment enters the interior cavity 40, it falls to the bottom onto ports in a suction pipe 14 that carries the concentrated sediment away laterally to a filtering device (not shown in FIG. 5). After filtering, the clarified water is returned to the stream.

Figure 6:
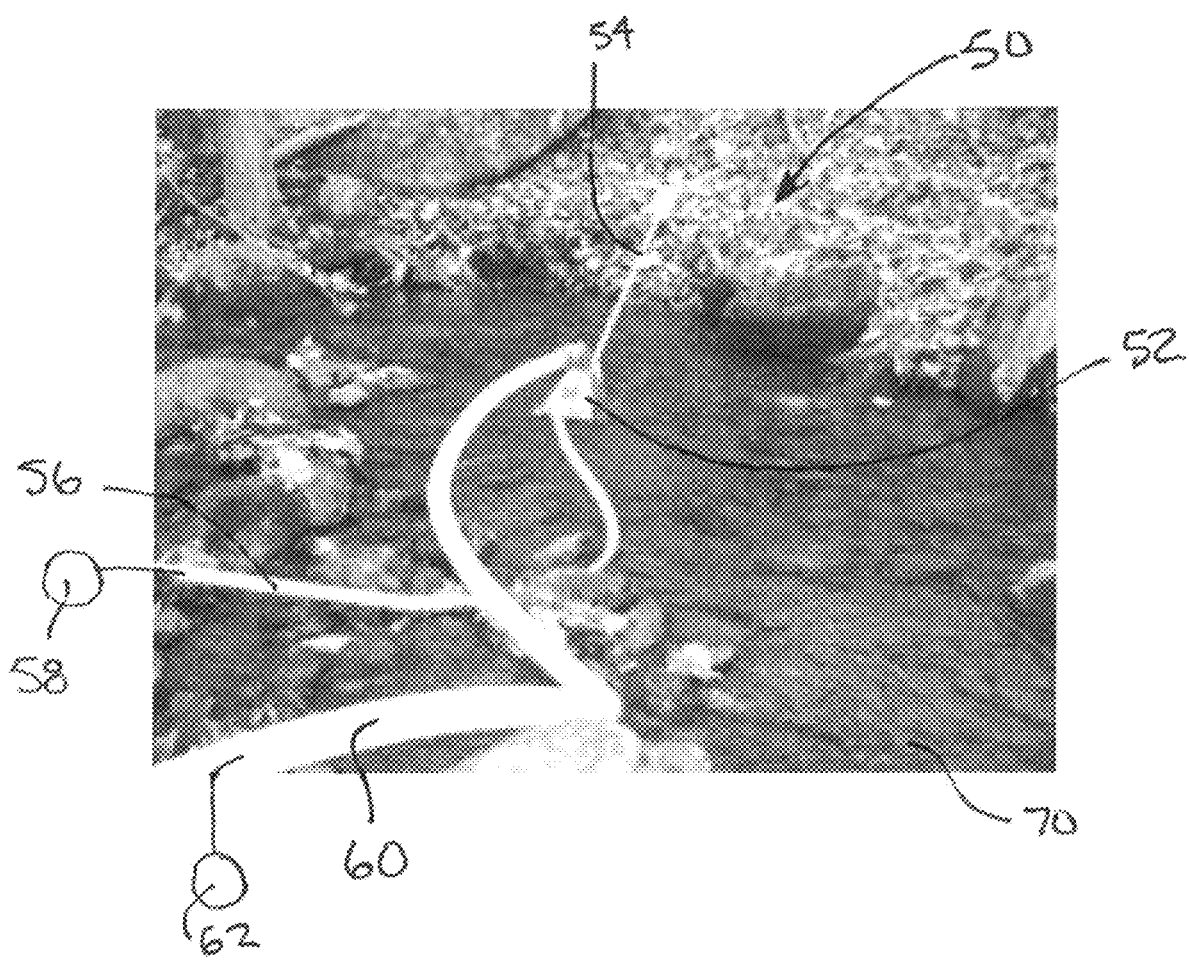
FIG. 6 is a diagram of a portable, hand-held sediment collection system for removing sediment from a stream.

FIG. 6 depicts a portable, hand-held sediment collector 50, as described further in U.S. Pat. No. 7,513,008, incorporated herein by reference for all purposes. A complete description here is unnecessary as the incorporated literature contains this. Briefly, however, a shroud or hood 52 is fitted with a handle bar and extension 54 for maneuvering the hood 52 along the bottom of a stream 70. The hood 52 houses a water jet system, including a nozzle that is connected via a pressurized hose 56 to a source 58 of pressurized water. The hood 52 is also fitted with a suction system, including a suction hose 60 connected to a vacuum source 62. Controls for activating the jet system and the suction system may be found near the handle bar grips. In operation, the hood is deployed over the stream bed floor and the jet system is activated. The nozzle sprays pressurized water downward into the stream bed to loosen sediment resting there. Simultaneously, the suction system draws the loosened sediment and water out of the stream bed to a filtration system (not shown in FIG. 6).

Figure 7:
FIG. 7 is a photograph of a non-limiting example system for removing sediment from a body of water.

FIG. 7 depicts another non-limiting example known as Sand Wand™, by Streamside, LLC (Findlay, Ohio), which has proven beneficial in the response and remediation of contaminated sediments following spills or other impact events in a waterway. The Sand Wand™ uses a manually operated, two-part pumping system to selectively remove only fine particles by first directing jetted water down into the substrate, creating a plume contained inside a hooded shroud. Then, the suction pulls by vertical lift volume and not velocity to only remove the finer particles that pass through the grate on the bottom of the head. By doing this, there is no added turbidity into the water column, and all contaminated sediment is contained and removed. Using the composite particles described herein with the Sand Wand™ technology allows for the ability to contain the contaminants following an oil spill into a stream, and prevents additional migration and affected area of contamination. Following a spill, the composite particles can be distributed immediately, and the impact area around the spill can be contained by, for instance, containment booms. This allows sufficient time for contractors to develop a remediation plan while the composite particles contain the spill. The Sand Wand™ can be used to actively remove the contained contaminated material absorbed in the composite particles. Use of the composite particles with Sand Wand™ may be advantageous because using the Sand Wand™ involves a person walking around through the contaminated water with the Sand Wand™, and it is somewhat difficult to walk around in contaminated water without disturbing the sediments and thereby releasing excess contaminants. Thus, the composite particles described herein are especially useful in conjunction with the Sand Wand™.

Other methods for removing sediment from a riverbed or stream bed may include dredging, such as by hydraulic or mechanical means. Systems for dredging sediment are well known in the art and in the literature, for example, from Sediment Removal Solutions, New Lenox, Ill., USA, (website: http://www.sedimentremovalsolutions.com/); from Organic Sediment Removal Systems, Necedah, Wis., USA, (website: http://www.pondclean.com/); and from Superior Seawalls & Docks, Illinois City, Ill., USA, (website: http://www.superiorseawalls.com/pages/siltremoval.html).

Regardless of the method used to remove the sediment, a common problem during sediment collection is that the mechanical and hydraulic mechanisms typically used are known to agitate and re-suspend settled sediment. This in turn upsets any partitioning equilibrium that may have been established, inevitably causing desorption and release of some of the sorbed contaminants, particularly the light-weight contaminant fraction, which is highly mobile in its partitioning. The same is true in a flowing body of water where the force of flow may drive the composite particles along the bed and against one another causing friction that agitates the particles, causing desorption.

A key advantage of the spalling composite particles described herein is that, depending on the particle design, they may continue or reinitiate spalling during such times of agitation, thereby exposing and releasing fresh sorptive material from sorbent layers to recapture the contaminants desorbed by the agitation. Given the high partitioning mobility of the light weight fractions, it may be particularly useful to use an activated carbon in the inner sorbent layer. If the time interval is short between dispersion of particles and removal of sediment, the existence of still spalling particles having activated carbon in the inner layer, may act as a fresh "reserve" of sorbent for recapturing the mobile light-weight fractions disturbed upon agitation.

Alternatively, if the time interval is sufficiently longer, it may be desirable to provide additional composite particles which can spall quickly to release a reserve of the activated carbon material to capture any such desorbed light-weight contaminants. Composite particles having activated carbon in the outer layer may be useful for this purpose. They should be provided prior to sediment removal for a time sufficient to allow spalling to begin to release activated carbon before sediment disturbance for collection.

Whether a particle is "still spalling" relative to the "short" or "long" time intervals mentioned above is a function of many factors, both location-specific and particle design-specific. For example, the speed of water flow around the particles and the temperature and pH of the water may impact the erosion and rate of hydration and spalling. Also, the relative amounts and types of binders and swellable, hydratable clays, and the presence or absence of additional protective outer coatings, may also impact the rate of hydration and spalling and release of sorbent materials and activated carbon.

EXAMPLE

Figure 4A:
FIGS. 4A-4C are time lapse photos showing the composite particles as they undergo the spalling process.
Figure 4B:
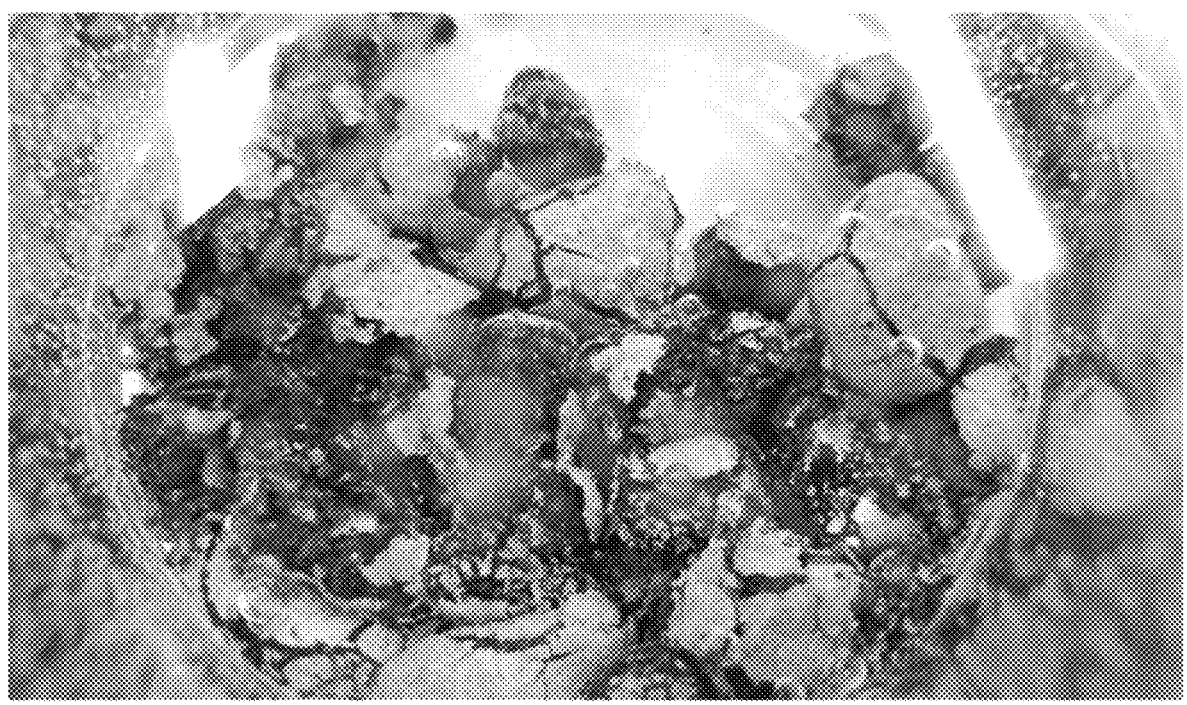
Figure 4C:

Composite particles were prepared using AASHTO #8 size aggregate stone as a core and coated first with an inner layer of bentonite, and then with an outer layer of powdered activated carbon (PAC). A third layer of bentonite was coated over the PAC with a fourth layer of organoclay on top of that. A sample of the particles was placed in a container of water without agitation and observed over time. FIGS. 4A-4C show the particles spalling at times of 30 seconds, 30 minutes, and 16 hours, respectively, after contacting the water. The data show considerable swelling and breaking apart—i.e., spalling—of the particles over this time period.

The principle and mode of operation of this invention have been explained and illustrated with respect to various exemplary embodiments. Of course, this invention may be practiced otherwise than as specifically explained and illustrated herein without departing from its spirit or scope. Accordingly, numerous modifications and variations on the present invention are obviously possible in light of the disclosure and thus the present invention may be practiced otherwise than as specifically described herein without departing from the spirit and scope of the present invention. Therefore, the foregoing disclosure is merely illustrative of various exemplary aspects of the present invention and numerous modifications and variations can be readily made by skilled artisans that fall within the scope of the accompanying disclosure.

What is claimed is:

1. A spallable composite particle, comprising:
   a natural stone or aggregate core at least partially coated with two or more coating layers, including:
      a first layer of hydratable, swellable clay material over the core,
      an inner sorbent layer disposed over the first layer of hydratable, swellable clay material, the inner sorbent layer containing a first sorptive material for binding a first type of contaminant,
      a second layer of hydratable, swellable clay material over the inner sorbent layer, and
      an outer sorbent layer disposed over the second layer of hydratable, swellable clay material, the outer sorbent layer containing a second sorptive material for binding a second type of contaminant, the second sorptive material being different than the first sorptive material.

2. The spallable composite particle of claim 1, wherein the first sorptive material has a sorption coefficient effective for sorbing light-weight hydrocarbon contaminants, and the second sorptive material has a sorption coefficient effective for sorbing heavy-weight hydrocarbon contaminants.

3. The spallable composite particle of claim 2, wherein the first sorptive material is activated carbon and the second sorptive material is an organoclay.

4. The spallable composite particle of claim 1, wherein the first sorptive material has a sorption coefficient effective for sorbing heavy-weight hydrocarbon contaminants, and the second sorptive material has a sorption coefficient effective for sorbing light-weight hydrocarbon contaminants.

5. The spallable composite particle of claim 1, wherein the inner sorbent layer comprises activated carbon, the outer sorbent layer comprises an organoclay, and the hydratable, swellable clay material is selected from bentonite, montmorillonite, illite, kaolinite, and attapulgite.

6. The spallable composite particle of claim 1, wherein the first layer of hydratable, swellable clay material comprises a bentonite.

7. The spallable composite particle of claim 1, wherein the second layer of hydratable, swellable clay material comprises a bentonite.

8. The spallable composite particle of claim 1, wherein the first layer of hydratable, swellable clay material comprises a bentonite, and wherein the second layer of hydratable, swellable clay material comprises a bentonite.

9. A composition comprising a plurality of spallable composite particles, wherein:
   a first type of composite particle comprises
      a natural stone or aggregate core at least partially coated with two or more coating layers, including
         a first layer of hydratable, swellable clay material over the core, an inner sorbent layer disposed over the first layer of hydratable, swellable clay material, the inner sorbent layer containing a first sorptive material for binding a first type of contaminant, the first sorptive material having a sorption coefficient effective for sorbing the first type of contaminant, a second layer of hydratable, swellable clay material over the inner sorbent layer, and an outer sorbent layer disposed over the second layer of hydratable, swellable clay material, the outer sorbent layer containing a second sorptive material for binding a second type of contaminant, the second sorptive material being different than the first sorptive material, and the second sorptive material having a sorption coefficient effective for sorbing the second type of contaminant; and a second type of composite particle comprises a natural stone or aggregate core at least partially coated with two or more coating layers, including a first layer of hydratable, swellable clay material over the core, an inner sorbent layer disposed over the first layer of hydratable, swellable clay material, the inner sorbent layer containing the second sorptive material, a second layer of hydratable, swellable clay material over the inner sorbent layer, and an outer sorbent layer disposed over the second layer of hydratable, swellable clay material, the outer sorbent layer containing the first sorptive material.

10. The composition according to claim 9 wherein the first sorptive material has a sorption coefficient effective for sorbing light-weight hydrocarbon contaminants; and the second sorptive material has a sorption coefficient effective for sorbing heavy-weight hydrocarbon contaminants.

11. The composition according to claim 10 wherein the first sorptive material comprises activated carbon and the second sorptive material comprises an organoclay.

12. The composition according to claim 10, wherein the hydratable, swellable clay material in the first layer of hydratable, swellable clay material comprises a swellable clay or clay mineral selected from bentonite, montmorillonite, illite, kaolinite, and attapulgite.

13. A method of removing contaminants from a body of water, the method comprising:

dispersing into the body of water a plurality of spallable composite particles according to claim 1;

allowing at least the inner sorbent layer to absorb water, thereby causing swelling and spalling of portions of the sorbent layers, and exposing the first and second sorptive materials to contaminants in the body of water;

allowing the spalled portions of the sorbent layers to form sediment containing sorbed contaminants; and removing the sediment with sorbed contaminants.

14. The method of claim 13, wherein the body of water is a flowing body of water selected from a river, creek, stream, spring, channel, estuary, and brook.

15. The method of claim 13, wherein removing the sediment is done using a sediment hydraulic collector and filter system.

16. The method of claim 13, wherein removing the sediment is done by suctioning the sediment from the bottom of the body of water.

17. The method of claim 16, wherein the step of removing the sediment further comprises directing a high-pressure stream of water into the sediment bed to agitate and temporarily suspend the sediment, and suctioning the suspended sediment.

18. The method of claim 17, further comprising causing fresh additional spalling of the composite particles by the high pressure stream to expose additional sorptive material capable of sorbing suspended contaminants that may become desorbed by the agitation.

19. The method of claim 13, wherein removing the sediment is done by hydraulic or mechanical dredging.

20. The method of claim 14, wherein the natural stone or aggregate remains in the flowing body of water as river rock or cobbles.

21. The method of claim 20, further comprising causing additional spalling of the composite particles by agitation resulting from friction of the cores within the flowing body of water, to expose additional sorptive material capable of sorbing suspended contaminants that may become desorbed by the agitation.

22. The method of claim 16, wherein the step of removing the sediment is conducted by directing a jet of water at the sediment to cause the sediment to suspend within a hood, and suctioning the suspended sediment from the hood.

* * * * *